J. M. FELL.
TELEGRAPH REPEATER.
APPLICATION FILED AUG. 25, 1916.
1,238,009.
Patented Aug. 21, 1917.
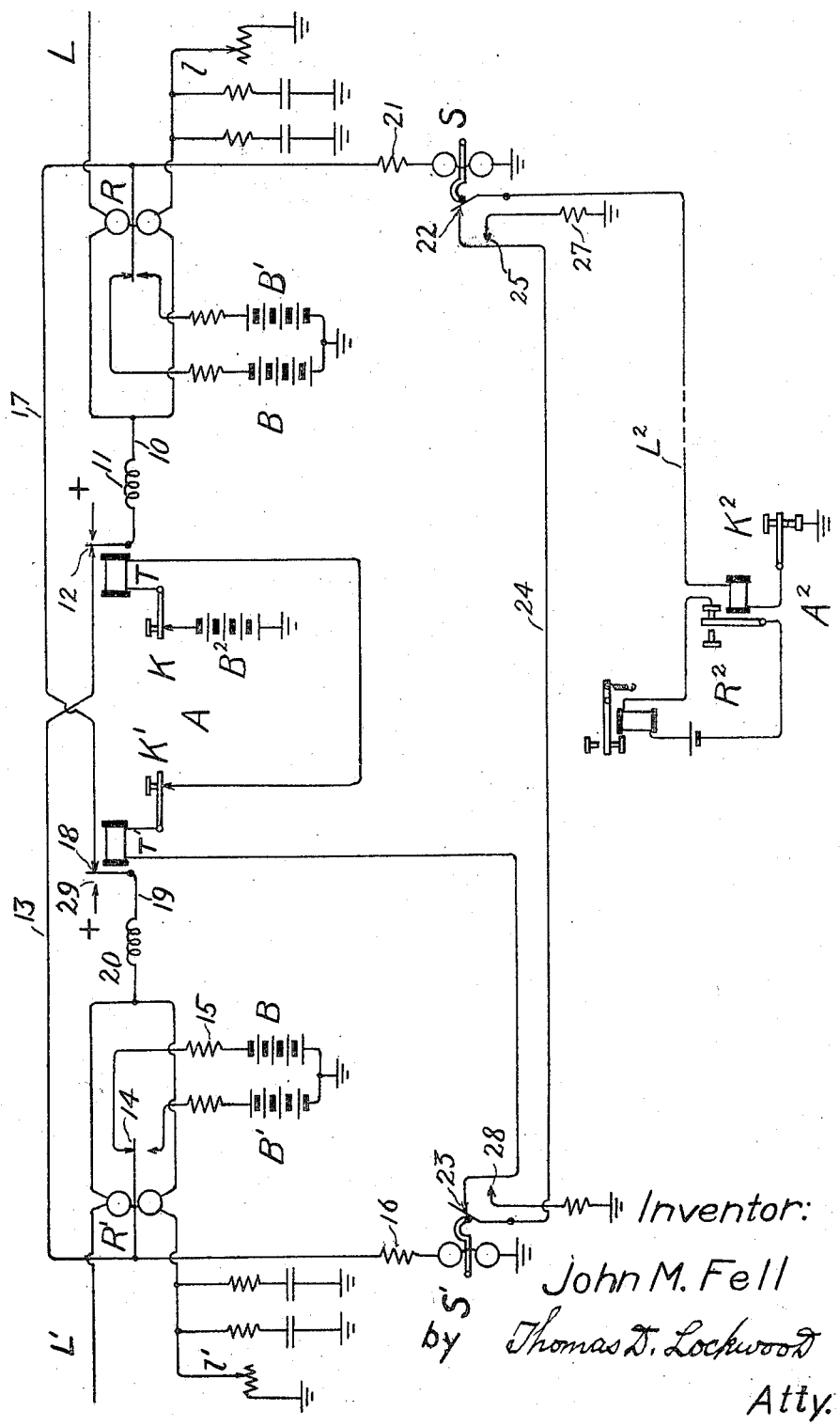
Inventor:
John M. Fell
by Thomas D. Lockwood
Atty.

UNITED STATES PATENT OFFICE.

JOHN M. FELL, OF HACKENSACK, NEW JERSEY, ASSIGNOR TO AMERICAN TELEPHONE AND TELEGRAPH COMPANY, A CORPORATION OF NEW YORK.

TELEGRAPH-REPEATER.

1,238,009.      Specification of Letters Patent.      Patented Aug. 21, 1917.

Application filed August 25, 1916. Serial No. 116,849.

*To all whom it may concern:*

Be it known that I, JOHN M. FELL, residing at Hackensack, in the county of Bergen and State of New Jersey, have invented certain Improvements in Telegraph-Repeaters, of which the following is a specification.

This invention relates to telegraphic repeating systems, and especially to one operated by the half duplex method for repeating between main line sections and also into branch or substation lines. The invention is chiefly directed to the provision of an organization whereby in a direct point repeater, or one in which apparatus of one section transmits signaling impulses to the adjacent section without other interposed active apparatus, a branch line may be operated over a single circuit with the substation equipment in accordance with ordinary Morse practice.

The drawing illustrates diagrammatically one embodiment of the invention.

The reference characters L and L′ designate line sections connected to one another through a central station A by repeating apparatus, which also serves to operatively associate with the main line sections a branch line L² extending to a substation A². The connecting apparatus is in the form of a half duplex repeater. For the main line sections L and L′ there are primary receiving electro-mechanisms consisting of polarized relays R and R′, respectively, each of which has its windings connected differently in the real line and the corresponding artificial line $l$ or $l'$ in the usual manner, while the armatures of the relays R, R′ move between opposite contacts to which are joined the negative and positive central station batteries B and B′. The armatures of relays R, R′ are connected to the windings of secondary receiving electro-mechanisms, which may be furnished by the polarized repeating sounders S and S′, respectively, and are also connected to the front contacts of transmitting electro-mechanisms consisting of the pole changers T′, T respectively of the duplex set. The armatures of the pole changers are joined through the common conductors of the duplex to the respective main line sections with their associated artificial lines. At the central station there is a connection in series from battery B² through an attendant's key K, winding of the pole changer T of one main line section, a like key K′, the winding of the pole changer T′ of the other line section and normal contacts of sounders S, S′. To this central station connection the substation line L² is joined, it including the receiving apparatus R² and transmitting apparatus or key K², as is customary in Morse operation. This substation line is shown as grounded, though a single metallic circuit may be substituted if desired. As illustrated, the sounders S and S′ at their back contacts each furnishes a locking ground connection for the pole changers of both line sections, they thus controlling the energization thereof.

In considering the operation of the system, let it be assumed that signaling impulses are being transmitted from the distant station over line L. Normally or with the pole-changing keys at each side of the repeating station closed on negative battery, there is no current in the line sections, while at the repeating station A current flows from the positive terminals of the batteries B by way of ground through the artificial lines, lower windings of the polarized relays, common conductors, front contacts of the pole changers, conductors 13 and 17 and armatures and normal contacts of the polarized relays to battery. The flow in the windings of the polarized relays is in such direction as to retain their armatures upon the normal contacts. When the pole-changing key of the distant transmitting station of line L is reversed, current from positive battery thereat passes over the line through the upper winding of relay R at station A, then divides, a small part going to ground through the lower winding of relay R and the artificial line $l$, while the larger part finds its way to ground through common conductor 10, inductance 11, contact 12 of pole changer T, conductor 13 and in parallel through contact 14 of relay R′, resistance 15 and battery B and resistance 16 and the winding of sounder S′. At the same time there is a divided flow of current from negative battery B at station A to ground, a portion going through the resistance 16 and winding of sounder S′. The other portion passes through conductor 13, contact 12 of pole changer T, common conductor 10 and inductance 11 and divides equally between the line L and artificial line $l$, both windings of relay R being included in these paths. The resultant effect of all these currents is such that relay R only is operated and opens its normal contact, closing the contact to positive battery B'. Thus as the distant key is oscillated, impulses of positive and negative current are applied to the armature of relay R from central station batteries B and B'. These find their way through conductor 17, contact 18 of pole changer T', common conductor 19, inductance 20, and in parallel through line L' and artificial line l', these including the windings of the differential relay R'. To current so applied relay R' does not respond, but the signals produce their effect upon the receiving apparatus of the distant station in line L'. The impulses from the armature of relay R have as well a path through resistance 21 and the winding of repeating sounder S. This is operated and opening and closing contact 22 breaks and completes the continuity of substation line L², the circuit from battery B² including key K, winding of pole changer T, key K', winding of pole changer T', normal contact 23 of sounder S', conductor 24, contact 22 of sounder S, substation line L², receiving apparatus R² and transmitting apparatus K². Consequently the apparatus R² also produces the transmitted signals. Contact 25 of sounder S is made before contact 22 opens and joins conductor 24 through resistance 27 to ground, this completing a locking circuit for both the pole changers T and T' which serves to hold them energized to prevent mutilation of the signals which are being repeated, when the normal energizing circuit of the pole changers over the line L² is opened at contact 25. In the same manner transmission may occur from line L', the signals being repeated into line L² at contact 23 of sounder S' and the locking connection for the pole changers being through contact 28 of sounder S'.

When the operator at A² actuates the key K² he effects simultaneous transmission into both line sections. Considering transmission over line L' as representing either, the breaking of line L² and the consequent de-energization of pole changer T' (together with pole changer T), causes a positive impulse to flow from battery and contact 29 through the armature of the pole changer T', common conductor 19, inductance 20, and the line L' and artificial line l', operating the distant receiving apparatus without affecting the relay R', on account of the differential character of the windings of the latter. Negative current is furnished at contact 18 of the pole changer T' by way of conductor 17 and the normal contact of relay R. This control of the pole changers also gives the operator at substation A² the power of arresting transmission in either direction over the main line by opening his key to release the pole changers, and thus send out break signals over both line sections.

It will be seen that the herein described system gives in a half duplex repeater the advantages of direct point operation by the transmission of signals from one line section to another directly through the active contacts of the line relays and normal contacts of the pole changers, with the consequent freedom from distortion of signals which results when they must act upon a chain of apparatus; and also, that the substation line, while receiving signals from both main line sections and being adapted to transmit to said sections, may be operated over a single conductor and in acordance with the usual Morse methods.

I claim as my invention:

1. In a telegraph repeating system, the combination with a main line divided into sections, of transmitting and receiving apparatus for each section, and means under the influence of each of the receiving apparatus for controlling the transmitting apparatus of said sections and thereby normally closing a break in each section of the main line.

2. In a telegraph repeating system, the combination with a main line divided into sections, of transmitting and receiving apparatus for each section, and means under the influence of the receiving apparatus for locking the transmitting apparatus of said sections against operation.

3. In a telegraph repeating system, the combination with a main line divided into sections, of transmitting and receiving electro-mechanisms for each section, a circuit for the windings of said transmitting electro-mechanisms and branch locking circuits therefor controlled by a receiving electro-mechanism and each controlling both transmitting electro-mechanisms.

4. In a telegraph repeating system, the combination with a main line divided into sections, of transmitting and receiving electro-mechanisms for each section, a circuit for the windings of said transmitting electro-mechanisms controlled in the contacts of both receiving electro-mechanisms and a branch locking circuit controlled by a receiving mechanism and controlling each of said transmitting electro-mechanisms.

5. In a telegraph repeating system, the combination with a main line divided into sections, of transmitting and receiving electro-mechanisms for each section, direct connections between active contacts of the receiving electro-mechanism of one section and the normal contacts of the transmitting electro-mechanism of another section for repeating from one section into another, and a branch line including in series the windings of both transmitting electro-mechanisms.

6. In a telegraph repeating system, the combination with a main line divided into sections, of transmitting and receiving electro-mechanisms for each section, direct connections between active contacts of the receiving electro-mechanism of one section and normal contacts of the transmitting electro-mechanism of another section for repeating from one section into another, and a branch line including in series contacts of both receiving electro-mechanisms.

7. In a telegraph repeating system, the combination with a main line divided into sections, of transmitting and receiving electro-mechanisms for each section, direct connections between active contacts of the receiving electro-mechanism of one section and normal contacts of the transmitting electro-mechanism of another section for repeating from one section into another, and a branch line including in series the windings of both transmitting electro-mechanisms and contacts of both receiving electro-mechanisms.

8. In a telegraph repeating system, the combination with a main line divided into sections, of a transmitting electro-mechanism and a primary receiving electro-mechanism for each section, direct connections between active contacts of the receiving electro-mechanism of one section and normal contacts of the transmitting electro-mechanism of another section for repeating from one section into the other, a secondary receiving electro-mechanism under the control of each primary electro-mechanism, and a branch line including in series contacts of both secondary electro-mechanisms.

9. In a telegraph repeating system, a main line, a central station at which the main line is divided into sections, transmitting and receiving apparatus for each line section at the central station, a central station battery, connections at the central station for battery through the transmitting and receiving apparatus of both line sections, a substation, and a line joining the substation to said central station connections.

10. In a telegraph repeating system, a main line, a central station at which the main line is divided into sections, transmitting and receiving electro-mechanisms for each line section at the central station, a central station battery, connections at the central station for battery through the windings of the transmitting electro-mechanisms and contacts of the receiving electro-mechanisms of both line sections in series, a substation, and a line joining the substation to said central station connections.

In testimony whereof I have signed my name to this specification in the presence of two subscribing witnesses, this 21st day of August 1916.

JOHN M. FELL.

Witnesses:
RALPH E. PIERCE,
B. PERRY HAMILTON.

Copies of this patent may be obtained for five cents each, by addressing the "Commissioner of Patents, Washington, D. C."